W. A. BARKER, DEC'D.
R. B. FERREBY, ADMINISTRATOR.
CHUCK.
APPLICATION FILED OCT. 6, 1921.
1,429,395.
Patented Sept. 19, 1922.
2 SHEETS—SHEET 1.
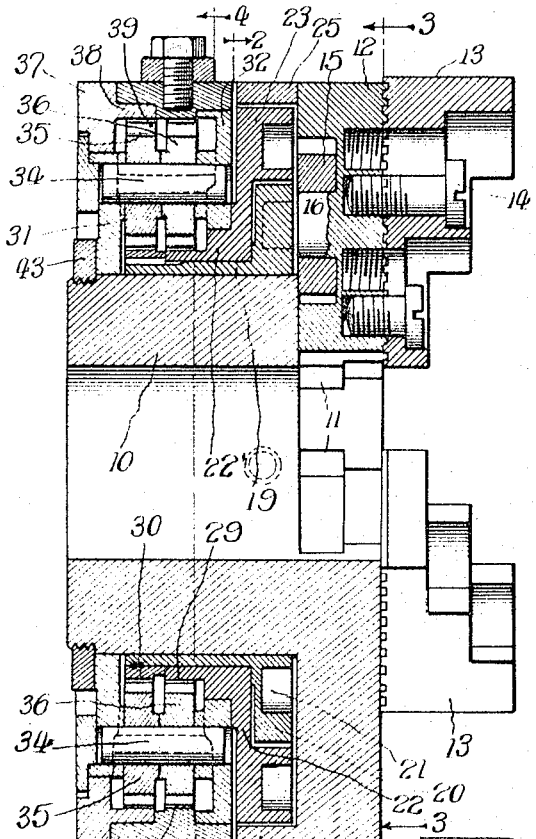
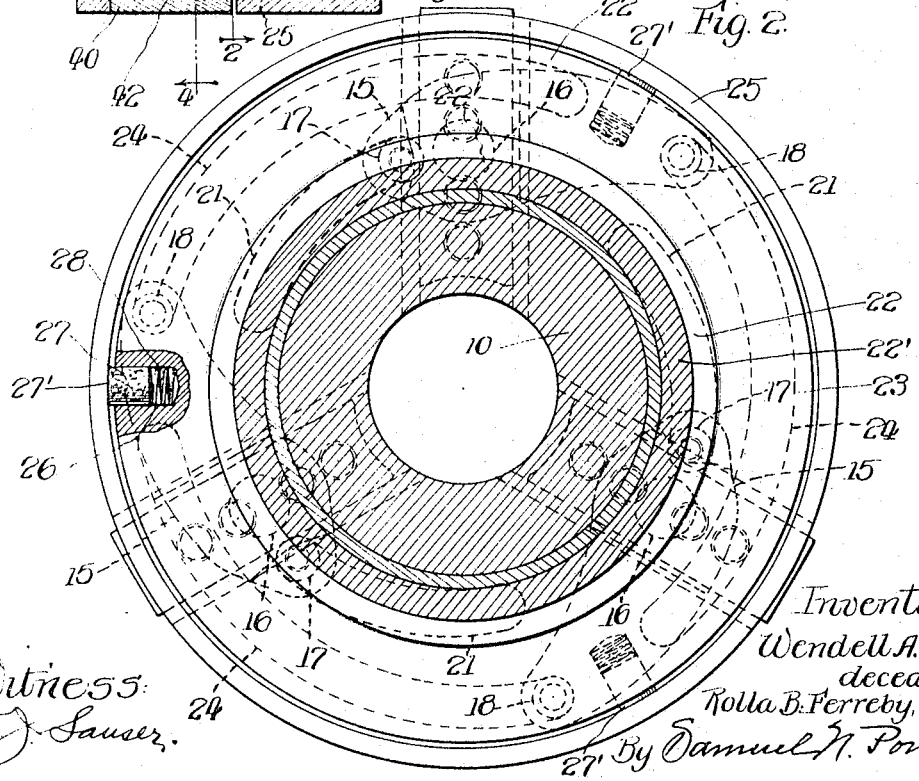
Witness
J. Sauser.
Inventor:
Wendell A. Barker,
deceased,
Rolla B. Ferreby, Adm'r.
By Samuel N. Pond, Atty.

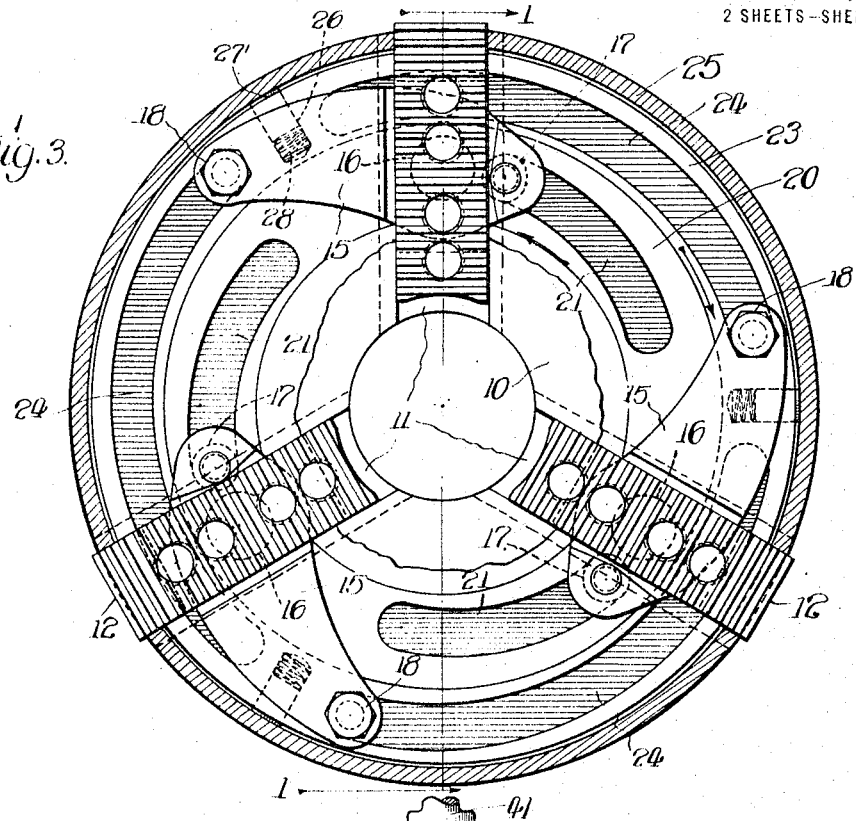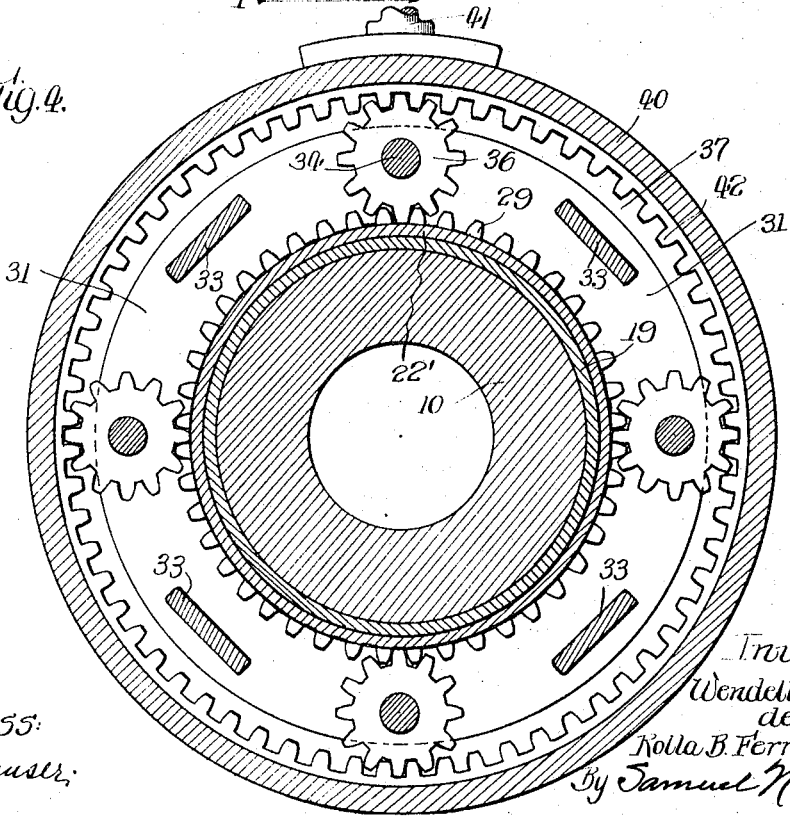

Patented Sept. 19, 1922.

1,429,395

UNITED STATES PATENT OFFICE.

WENDELL A. BARKER, DECEASED, LATE OF ELKHART, INDIANA, BY ROLLA BARKER FERREBY, ADMINISTRATOR, OF ELKHART, INDIANA.

CHUCK.

Application filed October 6, 1921. Serial No. 505,792.

*To all whom it may concern:*

Be it known that WENDELL A. BARKER, deceased, late a citizen of the United States, residing at Elkhart, in the county of Elkhart and State of Indiana, did invent certain new and useful Improvements in Chucks, of which the following is a specification.

This invention relates to chucks adapted to be used on lathes and similar machine tools, and has reference to an improved mechanism for actuating the work engaging jaws into, and hold them in, gripping relation to the work.

The present invention is based upon a type of chuck disclosed in Letters Patent to Wendell A. Barker, No. 1,249,300 December 11, 1917 and No. 1,389,731, September 6, 1921, this type being characterized by the employment of jaw actuating levers mounted in the chuck body and actuated by rotary cams mounted on and concentric with the hub of the chuck body, and a planetary gear transmission between the hub and the cams by which the latter, when the chuck is revolving, are maintained relatively stationary to the chuck body, and a manually operated device by the actuation of which a relative movement of the cams to the chuck body so as to actuate the jaw actuating levers can be effected, either when the chuck is idle or when it is rotating.

It will be readily understood that a chuck must be capable of exerting very great pressure on the jaws in order to firmly hold the work being machined against the tearing out tendency of the cutting tools. Yet sufficient jaw movement must be allowed for in order to completely clear the work when it is being put into the jaws or taken out, and in many cases the jaws must clear a shoulder or irregularity that is much larger in diameter than the surface to be gripped.

In the chucks disclosed in the aforesaid patents this was taken care of by making the cams with two inclines, the initial incline being relatively abrupt and intended to give a large approach movement to the jaws, and the second incline being at a much lower angle to afford slight additional movement together with the gripping pressure. This additional movement in practice has been fixed at one-eighth inch on the diameter, and in most cases was ample to provide for whatever variations occurred in a run of castings, drop forgings or other duplicate parts. But there are some parts, such as hand hammered forgings, for which this gripping allowance is insufficient, and it is not practical to increase the gripping allowance either by changing the angle on the cam or by depressing the lever ratio, as this would decrease the gripping power, whereas an increased gripping power was found to be very desirable. These limitations of the chucks of the aforesaid patents gave rise to the improvement embodied in the present invention.

According to the present invention, instead of employing for each lever an abrupt cam and a low cam continuous with and stationary relatively to the abrupt cam, there are employed two relatively movable cams, to-wit—a relatively abrupt cam articulated to the lever close to the trunnion of the latter for effecting the approach and withdrawal movements of the jaws, and a relatively low long cam articulated to the lever at a greater distance from the trunnion and effecting the gripping and release movements of the jaws. In the embodiment of the invention herein shown and described the ring carrying the low cams is connected to the chuck body by one or more yieldable grips or brakes, so that it normally revolves with the chuck body, and, through a planetary gear transmission similar to that disclosed in the aforesaid patents, the other cam ring carrying the abrupt cams is likewise caused to revolve with the chuck body in the same direction and at the same speed. By means of a ring gear actuated by a hand lever and operating through the planetary transmission a relative rotation of the cam ring carrying the abrupt cams is set up, by which the jaws are brought into engagement with the work and then by further movement of the lever in the same direction, the friction between the other cam ring and the chuck body is overcome, and the cam ring carrying the low cams is caused to revolve in a direction to effect a powerful gripping of the jaws on the work.

The invention, its novel structural features, mode of operation, and advantages will be readily understood by persons skilled in the art from the following detailed description, taken in connection with the accompanying drawings wherein I have illustrated a practical and operative embodiment of the principle of the invention, and in which—

Fig. 1 is a central longitudinal sectional view through a chuck embodying the invention, taken on the line 1—1 of Fig. 3;

Fig. 2 is a transverse sectional view on the line 2—2 of Fig. 1;

Fig. 3 is a transverse sectional view taken on the line 3—3 of Fig. 1; parts of the face of the chuck being broken away;

Fig. 4 is a transverse sectional view taken on the line 4—4 of Fig. 1;

Referring to the drawings, reference character 10 designates the hollow hub of a chuck body which is designed to be mounted upon the spindle (not shown) of a lathe or like machine in a manner well understood. In a series of radially arranged grooves 11 formed in the front face of the chuck body are mounted a plurality (herein shown as three) of work holding jaws, each comprising a jaw base 12 and jaw proper 13, and fastening and adjusting bolts 14 for adjustably securing the jaw members 13 to their bases 12. The inner sides of the jaws and adjacent portions of the chuck head are hollowed out to receive a group of jaw actuating levers 15 that are fulcrumed near one end to the jaw bases 12 by round trunnions 16 on the latter. The short arm of each lever 15 carries a cam follower in the form of a roller 17 while the long arm of each lever carries a similar cam follower 18. Sleeved on the hub 10 of the chuck is a hub 19 of a cam ring 20, in the face of which are formed three cam grooves or slots 21 (Fig. 3), the walls of which have a comparatively steep or abrupt eccentricity relatively to the axis of the chuck. These abrupt cam grooves 21 are engaged by the cam followers 17. Sleeved on the hub 19 of the cam ring 20 is the hub 22′ of an annular disc 22, carrying a cam ring 23 that encircles the inner cam ring 20. This cam ring 23 has formed in its face a group of three cam grooves or channels 24, longer than the grooves or channels 21, and formed with inclined walls of relatively slight and gradual eccentricity relatively to the axis of the chuck. The cam grooves 24 are engaged by the followers 18 on the longer arms of the cam levers. On the rear side of the chuck body is a peripheral flange 25 that encircles the outer cam ring 23. In the periphery of the cam ring 23 are a plurality of radial sockets 26, herein shown as three in number, in each of which is a plug 27 provided with a friction face 27′ that is pressed against the inner periphery of the flange 25 by a compression spring 28.

Describing next the mechanism for rotating the inner cam ring simultaneously and equally with the outer cam ring and the chuck body, and for producing relative movement of said cam rings and the chuck body when chucking and unchucking the work, fast on the hub 22′ is a ring gear 29, and fast on the hub 19 alongside the ring gear 29 is a companion ring gear 30 having the same number of teeth as the gear 29. Encircling the hub of the chuck is rotatably mounted a gear cage comprising a pair of rings 31 and 32 integrally spaced and connected by cross bars 33 (Fig. 4). In this gear cage are mounted on pins 34, four pairs of planet gears, each pair consisting of a gear 35 meshing with the ring gear 30 and a gear 36 meshing with the ring gear 29, said gears 35 and 36 being of the same size and number of teeth and independently journaled side by side on the bearing pin 34. 37 designates a stationary annular rear wall that is suitably attached to the frame of the lathe and is provided with a forwardly extending flange 38 on which is formed an internal gear 39 encircling and meshing with the group of planet gears 35. Also mounted with capacity for turning movement on the flange 38 and on the outer periphery of the cage ring 32 is a ring 40 provided on its upper side with a radially projecting handle 41 (Fig. 4) by which said ring can be manually turned in either direction. On the inner periphery of the ring 40 is an internal gear 42 of the same size and number of teeth as the internal gear 39, said internal gear 42 encircling and meshing with the group of planet gears 36. An annular clamping nut or ring 43 is threaded onto the rear end of the chuck hub 10 to lock the gear cage on the hub and otherwise assist in uniting the parts and steadying the structure.

Assuming that the chuck is rotating, the gear 29 will rotate with the hub 10 of the chuck, since the cam ring 23 is frictionally engaged with the chuck body through the friction brakes 27, and by reason of the meshing relation of the planet gears 36 with the rotating gear 29 and the stationary internal ring gear 42 (the handle 41 being locked) the gear cage is rotated in the same direction as the chuck but at a slower speed. As the gear cage rotates, carrying with it the planet gears 35 each of which meshes with the gear 30 of the inner cam ring 20 and the stationary internal gear 39, the cam sleeve 19 and inner cam ring itself are rotated in the same direction as the outer cam ring and the chuck and at the same speed. Since the jaw operating levers 15 are carried by the chuck body, and both cam rings are rotating in the same direction and at the same speed as the chuck body, it is manifest that no relative movement between the cam rings and the levers takes place, and consequently the jaws remain stationary relatively to the chuck body.

Assuming now that the chuck is idle and that it is desired to close the jaws upon a piece of work. The handle 41 is swung by the operator in a counter-clockwise direction, viewing Fig. 4, or toward the observer, viewing Fig. 1, carrying with it the movable internal gear 42 which, acting through the planet gears 36, causes a rotation of the planet gear cage in the same direction, and the rotation of the planet gears 35 on their own axes caused by such rotation of the gear cage and the engagement of the planet gears 35 with the stationary internal gear 39. The planet gears 35 thus set up through the gear 30, a rotation of the inner cam ring 20 in a direction indicated by the arrow in Fig. 3. This causes a comparatively rapid travel of the jaws into engagement with the work through the action of the cams 21 on the cam followers 17. Just as soon as the jaws engage the work, the rotation of the cam ring 20 ceases, and the gear 30 becomes stationary relatively to the chuck. The gear cage thus ceases to turn since the planet gears 35 are locked against bodily movement through engagement with stationary gears 39 and 30. The lever 41 is then swung farther in the same direction, causing the planet gears 36 to turn on their own axes while bodily stationary. This overcomes the friction of the brakes, and imparts a rotation to the outer cam ring 23 in the opposite direction, as indicated by the arrow in Fig. 3, whereby a powerful gripping force is transmitted to the jaws through the cams 24 acting on the long arms of the levers 15.

Precisely the same relative movements of the parts take place when the chuck is rotating as occur when it is stationary, so that, as in the prior patents above referred to, the work can be chucked and unchucked equally well when the chuck is stationary and when it is rotating.

Among the advantages of the present construction over the constructions disclosed in the patents aforesaid may be mentioned: first, the total jaw movement is greater than the total jaw movement of the two portions of the cam afforded by the old construction, thereby giving the jaws greater clearance from the work when in the open position; second, a gripping pressure is obtained during any part of this movement thereby giving a gripping variation many times that obtainable with the single cam construction, so that pieces of work varying considerably in size can be chucked without readjusting the jaws; third, since very little additional movement is required after the movement cam has brought the jaws to the work, the gripping cam can be made with very low angled grooves which, together with the long leverage of the trunnion lever, results in very great jaw pressure; fourth, by engaging both ends of the trunnion levers in the cam grooves, respectively, the leverage ratios can easily be changed to suit special conditions much more readily than in the former construction; and fifth, the considerable longer jaw movement obtainable with the present construction reduces the necessity of adjusting the positions of the jaws on their bases for the handling of work of varying diameters.

It is believed that this invention, its mode of operation and advantages will be readily understood from the foregoing without further description. Manifestly, variations and modifications in the details of structure and arrangement herein illustrated and described can be made without involving any departure from the invention or sacrificing any of the advantages thereof.

What is claimed, and desired to be secured by Letters Patent, is:

1. In a chuck, the combination of a rotatable chuck body, jaws movable radially therein, levers pivoted between their ends to said jaws respectively, cam means coaxial with said body and normally rotating at the same speed and in the same direction as the latter and operatively engaged with one arm of each of said levers, other cam means coaxial with said body and normally rotating at the same speed and in the same direction as the latter and operatively engaged with the other arm of each of said levers, and means for effecting relative rotation of both said cam means to each other and to said body.

2. In a chuck, the combination of a rotatable chuck body, jaws movable radially therein, levers pivoted to said jaws and each having relatively short and long arms, cam means coaxial with said body and normally rotating at the same speed and in the same direction as the latter and operatively engaged with the short arms of said levers, other cam means coaxial with said body and normally rotating at the same speed and in the same direction as the latter and operatively engaged with the long arms of said levers, and means for effecting relative rotation of both said cam means to each other and to said body.

3. In a chuck, the combination of a rotatable chuck body, jaws movable radially therein, levers pivoted between their ends to said jaws respectively, a cam ring coaxial with said body and normally rotating at the same speed and in the same direction as the latter and formed with relatively steep cams operatively engaged with one arm of each of said levers, another cam ring coaxial with said body and normally rotating at the same speed and in the same direction as the latter and formed with relatively low cams operatively engaged with the other arm of each of said levers, and means for effecting relative rotation of said cam rings to each other and to said body.

4. In a chuck, the combination of a rotatable chuck body, jaws movable radially therein, levers pivoted to said jaws and each having oppositely extending relatively short and long arms, a cam ring coaxial with said body and normally rotating at the same speed and in the same direction as the latter and formed with relatively steep cams operatively engaged with the short arms of said levers, another cam ring coaxial with said body and normally rotating at the same speed and in the same direction as the latter and formed with relatively low cams operatively engaged with the long arms of said levers, and means for effecting relative rotation of said cam rings to each other and to said body.

5. In a chuck, the combination of a rotatable chuck body, jaws movable radially therein, levers pivoted to said jaws and each having oppositely extending relatively short and long arms, a cam ring coaxial with said body and normally rotating at the same speed and in the same direction as the latter and formed in one side thereof with relatively steep cam grooves operatively engaged with the short arms of said levers, another cam ring encircling said first-named cam ring and normally rotating at the same speed and in the same direction as said body and formed in the corresponding side thereof with relatively low cam grooves operatively engaged with the long arms of said levers, and means for effecting relative rotation of said cam rings to each other and to said body.

6. In a chuck, the combination of a rotatable chuck body, jaws movable radially therein, levers pivoted between their ends to said jaws respectively, a pair of cam rings coaxial with said body and carrying cams operatively engaged with the respective arms of said levers, a friction brake yieldably connecting one of said cam rings to said body, a planetary gear transmission from said last named cam ring to the other cam ring whereby both rings normally rotate at the same speed and in the same direction as said body, and means operating through said planetary gear transmission to effect relative rotation of said cam rings to each other and to said body.

7. In a chuck, the combination of a rotatable chuck body, jaws movable radially therein, levers pivoted between their ends to said jaws respectively, inner and outer cam rings coaxial with said body and formed with cams operatively engaged with the respective arms of said levers, a friction brake yieldably connecting said outer cam ring to said body, a planetary gear transmission from said outer cam ring to said inner cam ring whereby both rings normally rotate at the same speed and in the same direction as said body, and means operating through said planetary gear transmission to effect relative rotation of said cam rings to each other and to said body.

8. In a chuck, the combination of a rotatable chuck body having a circumferential flange, jaws movable radially in said chuck body, levers pivoted between their ends to said jaws respectively, an outer cam ring coaxial with said body and lying within said flange and formed with cams operatively engaged with one arm of each of said levers, an inner cam ring coaxial with said body and formed with cams operatively engaged with the other arm of each of said levers, spring pressed brake shoes mounted in the periphery of said outer cam ring and frictionally engaged with said flange, a planetary gear transmission from said outer cam ring to said inner cam ring, whereby both rings normally rotate at the same speed and in the same direction as said body, and means operating through said planetary gear transmission to effect relative rotation of said cam rings to each other and to said body.

ROLLA BARKER FERREBY,
*Administrator of the estate of
Wendell A. Barker, deceased.*